JOHN W. OEHRLI,
INVENTOR.
WHANN & McMANIGAL
Attorney for Applicant

Nov. 1, 1960  J. W. OEHRLI  2,958,234
PLANETARY TRANSMISSION FOR AUTOMOTIVE VEHICLE
Filed Jan. 16, 1958  2 Sheets-Sheet 2
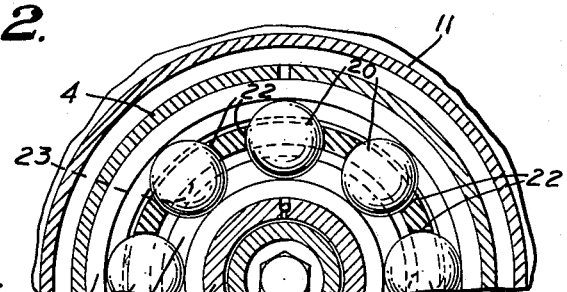
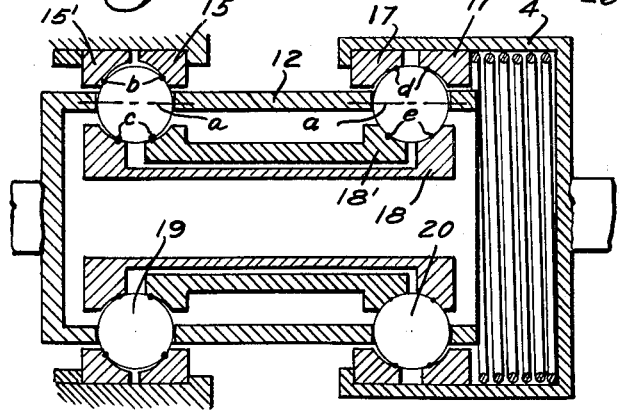
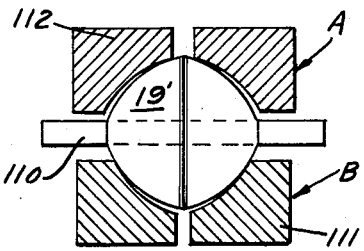
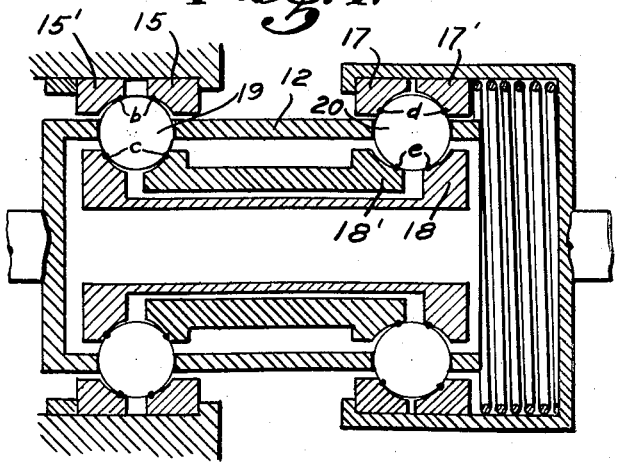
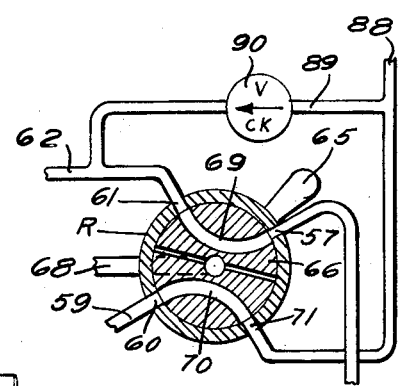
JOHN W. OEHRLI,
INVENTOR.
WHANN & McMANIGAL
Attorneys for Applicant

United States Patent Office 2,958,234
Patented Nov. 1, 1960

2,958,234

PLANETARY TRANSMISSION FOR AUTOMOTIVE VEHICLE

John W. Oehrli, Pacific Palisades, Calif., assignor to McCulloch Corporation, Los Angeles, Calif., a corporation of Wisconsin Filed Jan. 16, 1958, Ser. No. 709,366

9 Claims. (Cl. 74—472)

This invention relates to variable ratio transmissions, and relates in particular to a variable ratio transmission which may be continuously connected to a prime mover such as a motor or engine and a driven member, and which is variable in ratio by gradient instead of by step.

It is an object of the invention to provide a variable ratio transmission of planetary ball type which may be continuously connected between a driving and driven member and which may be adjusted by gradient so as to operate the driven member forwardly or reversely, without need for reverse gears.

It is an object of the invention to provide a variable ratio transmission of the character described employing a pair of variable ratio planetary ball type transmissions in side-by-side relation, these transmissions being connected by a transfer member whereby the action of one of the transmissions is transferred to and through the remaining transmission to a power output member, the mechanism having means adjustable and operative so as to cause the transmissions to cooperate in a manner to drive the output member either in forward or reverse directions.

It is a further object of the invention to provide an automatic power transfer mechanism of the character described in the foregoing, wherein each transmission comprises inner and outer races which are of split character, each consisting of a pair of complementary race rings in axially movable relation whereby the ratios of the transmissions are variable, there being means for contracting and expanding the race rings of the separate transmissions in alternate relation.

A further object of the invention is to provide in the contracting means for the selected pairs of race rings negative rate springs supplemented by fluid operated motor means.

A further object of the invention is to provide an automatic power transfer device having an automatic control which responds to and acts in accordance with several complementary factors including engine speed, acceleration and load, and it is also an object of the invention to provide an automatic means for varying the pressures applied on the ball races of both transmissions so that at light engine loads the contact pressure of the balls against their races is reduced for longer life, higher efficiency and less noise, the higher pressures being applied only when higher power transmission through the mechanism is required.

The present invention provides a power transfer mechanism or variable ratio transmission especially suited for use in automotive vehicles for the reason that it provides a variation in ratio by gradient and avoids the need for costly and inefficient hydraulic torque converters.

Further objects and advantages of the invention may be brought out in the following part of the specification wherein parts have been described in detail for the purpose of competence of disclosure, without intending, however, to limit the scope of the invention which is defined in the claims.

Referring to the accompanying drawings which are for illustrative purposes only:

Fig. 2 is a fragmentary cross-section taken as indicated by the line 2—2 of Fig. 1;

Fig. 3 is a schematic view showing the positions of the ball races when the output shaft is driven forwardly;

Fig. 4 is a schematic view similar to Fig. 3 but showing the positions of the races for reverse driving of the output member;

Fig. 5 is a fragmentary schematic view showing the valve R in forward driving position; and Fig. 6 is a sectional view showing a modified type of ball.

Figure 1:
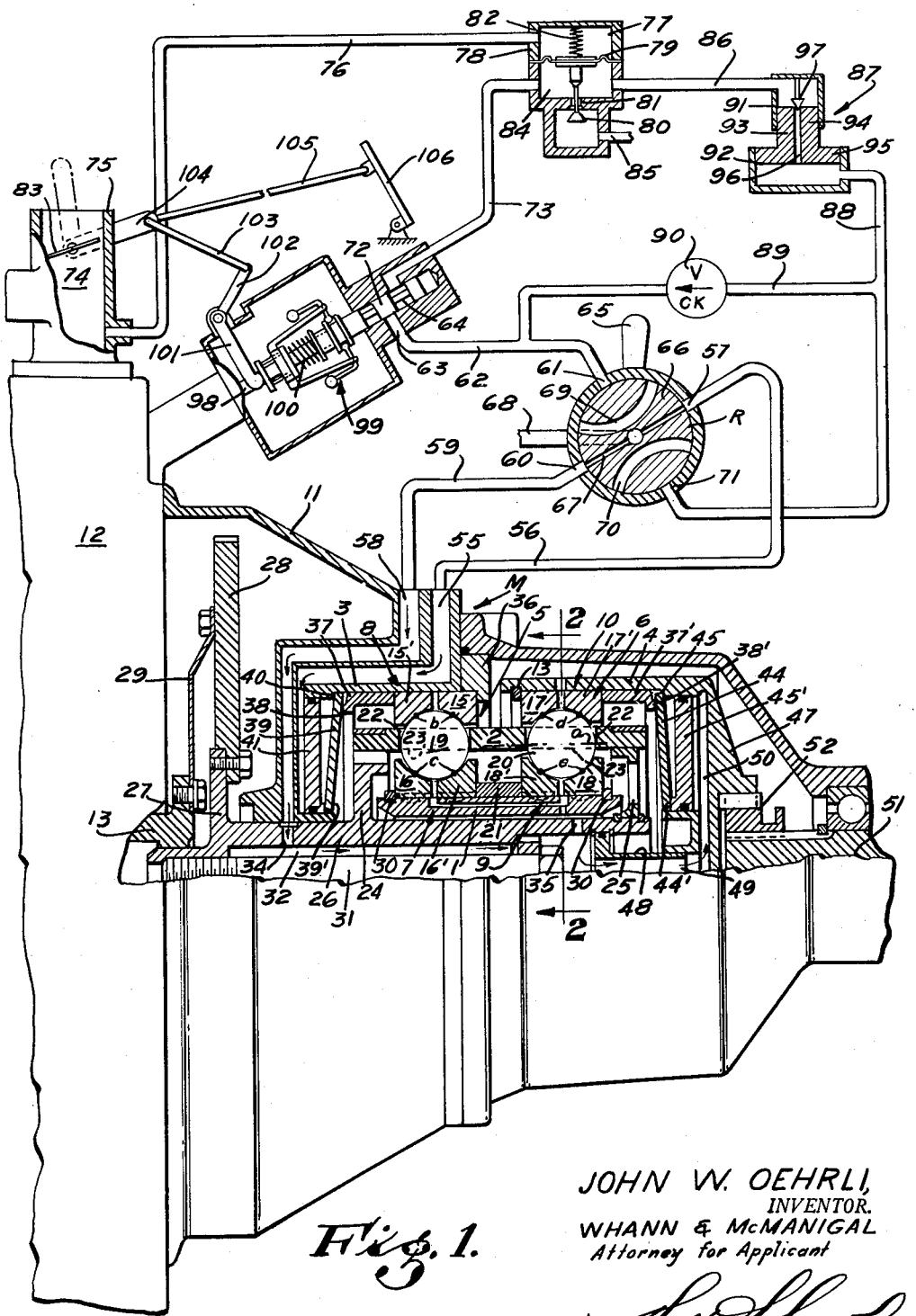
Fig. 1 is a schematic view of a preferred embodiment of the invention, showing the power transfer mechanism in quarter section.

The power transfer mechanism M as shown in Fig. 1 includes a shell 11, the upper half of which is shown, adapted to be bolted onto the face of an engine 12, in alignment with the end of the engine shaft 13. Within the shell 11 there are two ball type variable ratio transmissions 5 and 6 in side-by-side relation. The ball type transmission 5 includes an inner split race 7 and an outer split race 8. Between which inner and outer races 7 and 8, balls 19 are arranged so as to have rolling engagement with the race rings 16 of the inner race 7 and the race rings 15—15 of the outer race 8. The variable ratio transmission 6 has an inner split race 9 which is surrounded by an outer split race 10, with balls 20 arranged between the inner and outer races so as to have rolling engagement with the outer race rings 17 of the outer race 10 and the race rings 18 of the inner race 9.

The inner races 7 and 9 are referred to as the transfer races for the reason that it is through them that the driving effects of the transmissions 5 and 6 are transferred from one transmission to the other. The transfer races 7 and 9 are connected by a cylindrical transfer member 1, that member 1 acting to transfer rotative force from the race 7 to the race 9. The race rings 16 and 18 are keyed or otherwise connected to the cylinder member 1 so that they will not have relative rotary movement, but the adjacent race rings 16 and 18, 16' and 18' are arranged to have small axial movement on the cylindrical member 1. The spacer sleeve 21 is slidably mounted on the cylinder member 1 between the race rings 16' and 18'.

A second cylindrical member 2 is arranged between the inner and outer races of the transmissions 5 and 6, and is provided with openings 22 through which the balls 19 and 20 extend. The walls 23 of the second cylindrical member 2 constitute means for engaging the balls 19 and 20. By radial walls 24 and 25 the cylindrical member 2 is connected to a driving member 26 which is of cylindrical form, extends through the cylindrical transfer member 1 and also has on its leftward end a flange 27 adapted to be connected to the engine shaft 13. The flange 27 supports a flywheel 28 and driving connection with the engine shaft 13 is made through a metal disk 29. The radial walls 24 and 25 are arranged at opposite ends of the cylinder member 1 which has thereon stop rings 30 for limiting outward movement of the race rings 18. A cylindrical bar 31 is arranged within the cylindrical driving member 26, and between the parts 26 and 31 an oil passage 32 exists. Small oil passages 34 and 35 in the members 26 and 1 conduct a small flow of oil from the passage 32 to the operating parts of the variable ratio transmissions 5 and 6.

The split races 8 and 10 are referred to as the opposing races for the reason that they are arranged in positions respectively opposing the races 7 and 9. A cylindrical member 3 is arranged within the shell 11 to support the opposing race 8 so that it will not rotate. The race ring 15 rests against an annular shoulder 36, and a sleeve 37 is arranged in engagement with the outer radial face of the race ring 15', and has an annular shoulder or fulcrum 38 arranged to be engaged by an intermediate portion of a dished annular negative rate spring 39, in spaced relation to an annular shoulder 40 on the member 3 adapted to be engaged by the peripheral portion of the spring 39. The annular spring 39 is under strain and its inner peripheral portion 39' tends to move rightwardly from the position in which it is shown in Fig. 1, thereby urging the race ring 15' toward the race ring 15. A fluid pressure operated motor is arranged to supplement the pressure of the spring 39' in proportion to the pressure of fluid delivered thereto, as will be later explained in detail. This fluid motor consists of an annular piston 41 arranged in an annular cylinder 42 carried by the shell 11 adjacent the leftward face of the spring 39.

The opposing race ring 10 is connected to and supports a member 4 which is of cylindrical form. The race rings 17 and 17' are arranged within the leftward end of the member 4 and leftward movement of the race ring 17 is limited by a stop ring 43. Both of the rings 17 and 17' are keyed or otherwise connected to the member 4 so that they will not rotate relatively thereto, and so that the ring 17' will have axial movement toward the ring 17. A ring or sleeve 37' is slidably arranged in the member 4 so as to engage the rightward end of the ring 17', and is provided with an annular shoulder or fulcrum 38' arranged to be engaged by a portion of the annular negative rate spring 44, the outer periphery of which engages an annular shoulder 45 in the member 4. The annular spring 44 is also in negative rate position and its inner periphery 44' tends to move leftwardly, so that the ring 44 acts as a fulcrum lever against the fulcrum 38' and urges the ring 37' and the ring 17' leftwardly with a force equivalent to the force which the annular spring 39 exerts rightwardly against the ring 15'. The action of the spring 44 is selectively supplemented by fluid pressure operated motor means shown as an annular piston 45' slidable in an annular cylinder 46 formed within the rightward end of the member 4 adjacent the back face of the spring 44.

The member 4 has an end wall 47 and also a tubular wall 48 which projects from the end wall 47 into the rightward end of the cylindrical driving member 26. The interior of the tubular wall 48 forms an oil passage 49 communicating with the passage 32, and this passage 49 is connected through a radial passage 50 with the interior of the cylinder. A driven member 51 is provided in the form of a shaft aligned with the axis of rotation of the member 4 and having thereon clutch means 52 for connection of the driven member 51 to the rotatable member 4.

As shown in Fig. 1, the shell 11 has therein an oil passage 55 which is connected to the annular cylinder 42. This passage 55 is also connected through piping 56 with a port 57 of a reversing valve R. The shell 11 also has a passage 58 which connects with the passage 32 and ultimately with the annular cylinder 46. This passage 58 is connected through piping 59 with a port 60 of the reversing valve R. The reversing valve R has a port 61 which is connected through a duct 62 with the port 63 of a control valve 64 arranged to control the flow of high pressure fluid to the reversing valve R which in turn directs the fluid to either the cylinder 42 or the cylinder 46 depending upon the adjustment of the control lever 65 of the valve R to the right or to the left of the neutral position in which it is shown. The valve R, schematically shown as having a rotatable plug or body 66, is arranged when in neutral position to connect both of the ports 57 and 60, and accordingly the annular cylinders 42 and 46 through a pressure releasing passage 67 with a duct 68 which returns to the oil sump. If the body 66 is rotated in clockwise direction its passage 69 will connect the pressure port 61 with the port 57 communicating with the cylinder 42, and its passage 70 will connect a port 71 with the port 60 which communicates with the cylinder 46.

The control valve 64 has a slide closure 72 adapted to open the port 63 and establish a flow of oil through the port 63 from a duct 73 having oil therein at a pressure proportional to the pressure in the intake duct 74 of a carburetor 75 adapted to deliver a fuel mixture to the engine 12. As schematically shown in Fig. 1, the intake 74 is connected through a duct 76 with the vacuum chamber 77 of a control valve device 78 having a transverse diaphragm 79 connected to a valve 80 arranged to close a port 81 in response to increase in suction exerted in the chamber 77, against the pressure of a spring 82 which tends to move the valve 80 toward open position. Relatively high vacuum in the intake 74, existing when the butterfly valve 83 of the carburetor 75 is nearly closed, and the power delivered by the engine 12 is relatively low, acts in the chamber 77 to correct upward movement of the diaphragm 79, thereby moving the valve 80 toward its closed position and reducing the flow of oil into the chamber 84 of the control valve device 78 from a conduit 85 which is connected to a source of oil under pressure, such for example, an oil pump, not shown, which is driven by the engine 12. The duct 73 connects the chamber 84 with the control valve 64. Another duct 86 extends to a pressure reducing valve device 87 having its outlet 88 connected with the port 71, and also being connected through a duct 89 and a check valve 90 with the duct 62. The proportioning valve 87 has a small cylinder 91 connected to the duct 86 and a larger cylinder 92 connected to the duct 88. A piston member 93 has a small piston portion 94 extending in the cylinder 91 and a large piston portion 95 extending in the cylinder 92. The piston element 93 has an axial opening 96 adapted to be closed by a stationary closure 97 when the piston element is moved upward to the position in which it is shown in Fig. 1. When there is no pressure in the cylinder 92 below the piston portion 95, oil pressure in the cylinder 91 will force the piston element 93 downward so that oil under pressure may flow into the cylinder 92 and the duct 88. As the pressure in the duct 88 and in the cylinder 92 fills up it will act upwardly against the lower face of the piston portion 95 and bring the upper end of the passage 96 into closing relation to the closure 97 when the pressure in the cylinder 92 reaches a value determined by the cross-sectional areas of the piston portions 94 and 95. If the diameter of the piston portion 95 is twice that of the piston portion 94, the closure 97 will shut off flow through the passage 96 when the pressure in the cylinder 92 and the duct 88 is approximately one-quarter the pressure in the ducts 86 and 73.

The slide valve 72 is adapted to be actuated in response to the speed of rotation of a member driven by the engine 12. In Fig. 1, I have shown a shaft 98 which is driven at variable speed. It is connected to a centrifugal governor 99 which is adapted to move the slide valve 72 in a direction to open the port 63, against the force of a control spring 100 arranged to be adjusted by a lever 101 which is connected through a lever 102 and a link 103 with the valve operating lever 104 of the carburetor 75, this lever 104 being connected by link means 105 with an accelerator pedal 106. When the accelerator 106 is depressed the compression in the spring 100 is increased so that the action of the governor 99 is retarded and the slide valve 72 opens the port 63 at a lower rate in comparison to the increase in speed of the shaft 98. When the valve R is in neutral position, the pressures against the opposing races 8 and 10, tending to contract the race rings 15—15' and 17—17' are substantially balanced, the planetary transmissions 5 and 6 are adjusted to the same ratio. That is to say, the points of engagement $b$ of the balls 19 and 20 with the races 15—15′ and 17—17′ will be at the same distance from the axis of rotation $a$ of the balls 19 and 20. Also, the points of engagement $c$ of the balls 19 and 20 with the races 16—16′ and 18—18′ will be the same distance from the axis of rotation $a$ of the balls 19 and 20. Rotation of the cylindrical member 2 will cause the balls 19 and 20 to roll in the opposing races 8 and 10, the rolling balls causing the races 7 and 9 to rotate at the same speed, thereby revolving the cylindrical member 1 on its longitudinal axis.

If forward driving of the member 51 is desired, the control lever 65 will be swung rightward to rotate the valve body 66 into the position in which it is shown in Fig. 5. If the accelerator pedal 106 has not been depressed so as to speed up the engine and effect a movement of the slide valve 72 from the position in which it is shown in Fig. 1, whatever pressure exists in the duct 88 will be transmitted to the cylinders 42 and 46, urging them toward the member 2 and supplementing the force of the springs 39 and 44 to equal extent. Fluid from the duct 88 will pass through the duct 89, check valve 99, a portion of the duct 62, valve passage 69 and the duct 56 which communicates with the cylinder 42. At the same time, pressure from the duct 88 will pass through the passage 70 of the valve R and into the duct 59 which communicates with the annular cylinder 46. Therefore, as the pressure rises and falls in the ducts 73 and 88, the pressure in the annular cylinders 42 and 46 will always be as great as the pressure in the duct 88, which will be in turn proportional to the power being generated by the engine 12. The pressure in the cylinder 42, however, is increased as occasion may require by the opening of the valve 72 which connects the cylinder 42 with the duct 73 having therein a pressure which is a multiple of the pressure existing in the duct 88.

Referring now to Figs. 1 and 3, increase in fluid pressure in the annular cylinder 42, resulting from the opening of the valve 63, will urge the annular piston 41 rightwardly, supplementing the force of the spring 39 and moving the race ring 15′ toward the race ring 15, bringing these race rings 15 and 15′ closer together as shown in Fig. 3. The balls 19 will be crowded radially inwardly, spreading the race rings 16 and 16′ so that the race rings 16′ will be moved rightwardly from the position in which it is shown in Fig. 1 toward or into the position in which it is shown in Fig. 3. This will shift the race ring 18′ toward the race ring 18 so as to crowd the balls 20 outwardly, moving the race ring 17′ rightward away from the race ring 17. The points of contact $b$ of the balls 19 with the races 15—15′ will be moved toward the axis of rotation of the balls 19′, and at the same time the point of contact $c$ of the balls 19 with the races 16 and 16′ will be shifted away from the axis of rotation $a$. This will increase the velocity at which the cylindrical member 1 is revolved by the rolling balls 19 as compared to the velocity of the cylindrical member 2. Concurrently, the points of contact $d$ of the balls 20 with the race rings 17 and 17′ will be shifted away from the axis of rotation of the balls 20, and the points of contact $e$ of the balls 20 with the race rings 18 and 18′ will be moved closer to the axis of rotation of the balls 20 with the result that rotation of the member 4 is effected. By proper proportioning of the balls and races, rotation of the member 4 from zero speed to a forward speed of rotation three times that of the speed of rotation of the driving member 26 may be obtained.

If reverse rotation of the member 4 is desired, the valve body 66, Fig. 1, will be rotated counterclockwise from neutral position so as to bring the valve passage 69 into a position to connect the port 61 with the port 60, and the valve passage 70 into a position to connect the port 57 with the port 71. The annular cylinder 46 will then be in direct communication with the port 63 of the control valve 64, and opening of the port 63 will permit increase in the fluid pressure acting to move the annular piston 45 leftwardly to supplement the force of the spring 44 and shift the race ring 17′ toward the race ring 17. This, as shown in Fig. 4 will result in forcing the balls 20 radially inwardly, spreading the race rings 18 and 18′ and contracting the race rings 16 and 16′ so as to shift the balls 19 radially outwardly, which will effect a leftward movement of the race ring 15′ against the then smaller force of the spring 39 and the fluid pressure in the annular cylinder 42. The shifting of the points of contact $b$, $c$, $d$ and $e$ will be opposite from that which is shown in Fig. 3, toward or into the positions shown in Fig. 4. A decrease in the velocity of rotation of the member 1 relative to the member 2 will be effected and the action of the balls 20 will be then to cause the driving of the race rings 17 and 17′ in reverse direction so that reverse rotation of the member 4 is effected. The gradual shifting of the race rings from their neutral positions shown in Fig. 1 will effect a driving of the member 4 in reverse direection from zero velocity to a speed which may vary between 50 and 80 percent of the velocity of the driving member 26, depending upon the proportioning of the balls and races.

Herein the term "ball" has been employed in a broad sense. In the preferred practice of the invention the ball is, of course, a true sphere since this form is easily manufactured. As shown in Fig. 5, however, the balls 19′ may be a modified spheroid and may be revolved on an axle 110 and in rolling engagement with inner and outer split races 111 and 112.

I claim:

1. In a power mechanism: a pair of variable ratio ball type transmissions in side-by-side relation, each comprising a pair of transfer races in side-by-side relation and a pair of opposing races in side-by-side relation, and balls arranged between said transfer races and said opposing races in rolling engagement therewith, each of said races being split and comprising a pair of complementary race rings; a first member of cylindrical form tying said transfer races together; a second member of cylindrical form extending between said transfer races and said opposing races and having means for engaging said balls; a third member connected to one of said opposing races; a fourth member connected to the other of said opposing races; driving and driven elements connected respectively to the second and fourth of said members; means for holding the third member against rotation; means operative to adjust the race rings of said transmissions for different ratios, said means operative to adjust the race rings of said transmissions comprising first and second force exerting means, respectively, adjacent said opposing races, and being adapted to contact and release the race rings thereof in alternate relation; and means for controlling said force exerting means, said control means acting in response to the speed of rotation of a rotating member.

2. In a power mechanism: a pair of variable ratio ball type transmissions in side-by-side relation, each comprising a pair of transfer races in side-by-side relation and a pair of opposing races in side-by-side relation, and balls arranged between said transfer races and said opposing races in rolling engagement therewith, each of said races being split and comprising a pair of complementary race rings; a first member of cylindrical form tying said transfer races together; a second member of cylindrical form extending between said transfer races and said opposing races and having means for engaging said balls; a third member connected to one of said opposing races; a fourth member connected to the other of said opposing races; driving and driven elements connected respectively to the second and fourth of said members; means for holding the third member against rotation; means operative to adjust the race rings of said transmissions for different ratios, said means operative to adjust the race rings of said transmissions comprising first and second force exerting mean respectively, adjacent said opposing races, and being adapted to contract and release the race rings thereof in alternate relation; means for controlling the force exerting means; and a motor having a regulator, said driving element being connected to said motor and said control means acting in response to the speed of rotation of a member driven by the motor and also in response to the adjustment of the regulator of said motor.

3. In a power mechanism: a pair of variable ratio ball type transmissions in side-by-side relation, each comprising a pair of transfer races in side-by-side relation and a pair of opposing races in side-by-side relation, and balls arranged between said transfer races and said opposing races in rolling engagement therewith, each of said races being split and comprising a pair of complementary race rings; a first member of cylindrical form tying said transfer races together; a second member of cylindrical form extending between said transfer races and said opposing races and having means for engaging said balls; a third member connected to one of said opposing races; a fourth member connected to the other of said opposing races; driving and driven elements connected respectively to the second and fourth of said members; means for holding the third member against rotation; means operative to adjust the race rings of said transmissions for different ratios, said means being operative to adjust the race rings of said transmissions and comprising first and second force exerting means respectively adjacent said opposing races and being adapted to contract and release the race rings thereof in alternate relation; means for controlling said force exerting means; and an internal combustion engine having a fuel control, said driving element being connected to said internal combustion engine and said control means acting in response to the speed of rotation of a member driven by said engine and also in response to movement of said fuel control into the different positions of adjustment thereof.

4. In a power mechanism: a pair of variable ratio ball type transmissions in side-by-side relation, each comprising a pair of transfer races in side-by-side relation and a pair of opposing races in side-by-side relation, and balls arranged between said transfer races and said opposing races in rolling engagement therewith, each of said races being split and comprising a pair of complementary race rings; a first member of cylindrical form tying said transfer races together; a second member of cylindrical form extending between said transfer races and said opposing races and having means for engaging said balls; a third member connected to one of said opposing races; a fourth member connected to the other of said opposing races; driving and driven elements connected respectively to the second and fourth of said members; means for holding the third member against rotation; means operative to adjust the race rings of said transmissions for different ratios, said third member being held from rotation and said second member being connected to a motor having a power controller, and said means operative to adjust said race rings of said transmissions comprising a first force exerting means arranged to apply contracting force to said race rings of said opposing race which is connected to said third member, thereby effecting forward rotation of said fourth member; and a second force exerting means arranged to apply contracting force to said race rings of said opposing race which is connected to said fourth member, thereby causing said fourth member to rotate in reverse direction; a negative rate spring for each of said first and second force exerting means; a fluid motor supplementing respective negative rate springs; and means operative to apply fluid under pressure selectively to said fluid motors.

5. A power mechanism as defined in claim 4 wherein the power mechanism is arranged to be driven by an engine and said means operative to apply fluid under pressure to said fluid motor is arranged to vary the fluid in accordance with the speed of rotation of a rotatable member driven by said engine.

6. A power mechanism as defined in claim 5 wherein said engine has a fuel control and said means operative to apply fluid under pressure to said fluid motor is also responsive to changes in position of said fuel control.

7. In a power mechanism: a pair of variable ratio ball type transmissions in side-by-side relation, each comprising a pair of transfer races in side-by-side relation and a pair of opposing races in side-by-side relation, and balls arranged between said transfer races and said opposing races in rolling engagement therewith, each of said races being split and comprising a pair of complementary race rings; a first member of cylindrical form tying said transfer races together; a second member of cylindrical form extending between said transfer races and said opposing races and having means for engaging said balls; a third member connected to one of said opposing races; a fourth member connected to the other of said opposing races; driving and driven elements connected respectively to the second and fourth of said members; means for holding the third member against rotation; and means operative to adjust the race rings of said transmissions for different ratios, said means for adjusting said race rings each comprising a spring member and a fluid expansible member supplementing said spring member.

8. In a power mechanism: a pair of variable ratio ball type transmissions in side-by-side relation, each comprising a pair of transfer races in side-by-side relation and a pair of opposing races in side-by-side relation, and balls arranged between said transfer races and said opposing races in rolling engagement therewith, each of said races being split and comprising a pair of complementary race rings; a first member of cylindrical form tying said transfer races together; a second member of cylindrical form extending between said transfer races and said opposing races and having means for engaging said balls; a third member connected to one of said opposing races; a fourth member connected to the other of said opposing races; driving and driven elements connected respectively to the second and fourth of said members; means for holding the third member against rotation; and means operative to adjust race rings of said transmissions for different ratios, said means for adjusting said race rings, each comprising a negative rate spring member and a fluid expansible member supplementing said negative rate spring member.

9. In a power mechanism: a pair of variable ratio ball type transmissions in side-by-side relation, each comprising a pair of transfer races in side-by-side relation and a pair of opposing races in side-by-side relation, and balls arranged between said transfer races and said opposing races in rolling engagement therewith, each of said races being split and comprising a pair of complementary race rings; a first member of cylindrical form tying said transfer races together; a second member of cylindrical form extending between said transfer races and said opposing races and having means for engaging said balls; a third member connected to one of said opposing races for holding same against rotation; a fourth member connected to the other of said opposing races; driving and driven elements connected respectively to the second and fourth of said members; and power means operative to adjust the races of said transmissions for different ratios.

References Cited in the file of this patent

UNITED STATES PATENTS

| 1,847,027 | Thomsen et al. | Feb. 23, 1932 |
| 2,853,899 | Graham et al. | Sept. 30, 1958 |
| 2,874,592 | Oehrli | Feb. 24, 1959 |

FOREIGN PATENTS

| 446,140 | Germany | Mar. 18, 1923 |
| 282,491 | Switzerland | Aug. 16, 1952 |